United States Patent [19]

Yasutake

[11] Patent Number: 5,117,110
[45] Date of Patent: May 26, 1992

[54] COMPOSITE SCANNING TUNNELLING MICROSCOPE WITH A POSITIONING FUNCTION

[75] Inventor: Masatoshi Yasutake, Tokyo, Japan

[73] Assignee: Seiko Instruments, Inc., Tokyo, Japan

[21] Appl. No.: 557,856

[22] Filed: Jul. 24, 1990

[30] Foreign Application Priority Data

Jul. 5, 1989 [JP] Japan .................. 1-174793

[51] Int. Cl.⁵ .......................................... H01J 37/26
[52] U.S. Cl. .................................. 250/306; 250/491.1
[58] Field of Search ................ 250/306, 491.1, 310, 250/311

[56] References Cited

U.S. PATENT DOCUMENTS

| | | | |
|---|---|---|---|
| 4,447,731 | 5/1984 | Kuni et al. | 250/310 |
| 4,914,293 | 4/1990 | Hayashi et al. | 250/306 |
| 4,962,480 | 10/1990 | Ooumi et al. | 250/306 |
| 4,999,495 | 3/1991 | Miyata et al. | 250/306 |

OTHER PUBLICATIONS

Vazquez et al., Rev. Sci. Instrum. 59(8), Aug. 1988, pp. 1286–1289.

Primary Examiner—Jack I. Berman
Attorney, Agent, or Firm—Spensley Horn Jubas & Lubitz

[57] ABSTRACT

This invention relates to a scanning tunnelling microscope which has a mechanism which accurately guides the needle of the STM to a portion the position of which has been determined by another calibrating means. In the invention, a standard sample for positioning is observed under an optical microscope or SEM, then the same sample is observed under the STM and the positional relationship between the optical axis and the STM needle is determined from the two images. In such circumstances, because the scanning region of the STM is 10 to 12μ at most, it is necessary to have a standard sample with specific properties such that the position within this picture frame is recognizable. Here, we relate to a device which incorporates such a standard sample, determines the positional relationship between the two (the distance between the optical axis and the STM needle), compensates for this distance alone and makes it possible to observe the same point with both devices.

2 Claims, 7 Drawing Sheets

← CENTER LINE

↑ CENTER LINE

• CENTER OF A STM IMAGE
× CENTER OF A PARALLEL CROSS

FIG. 8

COMPOSITE SCANNING TUNNELLING MICROSCOPE WITH A POSITIONING FUNCTION

BACKGROUND OF THE INVENTION

With respect to a device in which a high-magnification calibrating apparatus with a narrow calibration range is combined with another calibrating apparatus in order to position the calibrating range in any desired location, this invention provides a means of determining and compensating for the discrepancies between the calibration positions of both apparatuses, and, more specifically, it relates to a composite device comprising a scanning tunnelling microscope (STM) and an optical microscope or scanning electron microscope (SEM).

In a conventional scanning tunnelling microscope, the calibration sample and the needle are observed obliquely using a stereoscopic microscope or the like. Because the sample is observed obliquely in this way, not all of the sample surface is in focus, and, furthermore, because a stereoscopic microscope has a low magnification of about 200 times at maximum, it has been extremely difficult to guide the STM needle to the location of the sample to be observed with a precision better than $10\mu$. Thus, with the STM, the intended sample location is sought by repeating an operation whereby the largest picture frame is scanned, the stage is conveyed forwards and the STM is scanned again. However, this method takes up a considerable amount of time and is inconvenient for practical purposes.

A STM device has a resolution of 2 to 3 Å in the lateral direction and a resolution of 0.1 Å or more in the longitudinal direction but a narrow scanning region of about $10-12\mu$ at most, and the field of view is insufficient to seek a specific position in a sample using the STM alone. There is therefore a need to combine it with a microscope with a wider field of view, and, in order to link the fields of view of the two, it is necessary to link the needle position of the STM and the optical axis of the other microscope.

Further, the STM has a problem in that the needle is a consumable article and is frequently changed so that it needs to be readily positionable. This invention has been designed to overcome such disadvantages and aims to provide a STM device which has a sample stage incorporating a standard sample within the device, has a mechanism for aligning the optical axis of an optical microscope on the central lines of this standard sample, has a mechanism which takes in the STM image and ascertains which position of the standard sample it corresponds to from this STM image, and has a mechanism which calculates the positional relationship between the optical axis and the STM needle and makes an accurate movement to this amount.

SUMMARY OF THE INVENTION

The main means adopted by this invention to achieve the abovementioned aim is as given below.

Thus, it is a composite scanning tunnelling microscope with a positioning function where the composite scanning tunnelling microscope is equipped with a scanning tunnelling microscope and with a microscope with a wider field of view, characterized in that it is provided with a positioning means consisting of a standard sample for positioning which is mounted in a stage comprised within the said microscope, a calculating means which calculates the relative distance between the optical axes of both microscopes from the positional relationship between the images of the standard sample observed under both of the abovementioned microscopes, a computing means which computes the amount of discrepancy of the scanning tunnelling microscope needle based on the results from the said calculating means, and a stage controller which controls the stage based on the results from the said computing means such that the optical axes of both microscopes are on the same point.

The complex scanning tunnelling microscope device according to this invention is one involving a combination of a scanning tunnelling microscope and a microscope with a wider field of view, more specifically an optical microscope or scanning electron microscope, and is one which is provided with a means for readily ascertaining the distance between the optical axes of the two so that, when observing a sample, it is easy to bring the optical axis of the STM onto the sample at the same point on the sample as that previously determined by the microscope with the wider field of view. It is therefore easier to set the position of the needle of the STM since, from the outset, it is possible to identify the calibration position on the sample with an optical microscope or SEM with a wider field of view with more accuracy, precision and more rapidly than with a conventional technique.

DETAILED DESCRIPTION OF EMBODIMENTS

A detailed explanation is now given using the example of a composite device with an optical microscope and a STM. The positioning method can also be appropriately applied to a composite device of a SEM and STM in a similar manner.

Figure 1:
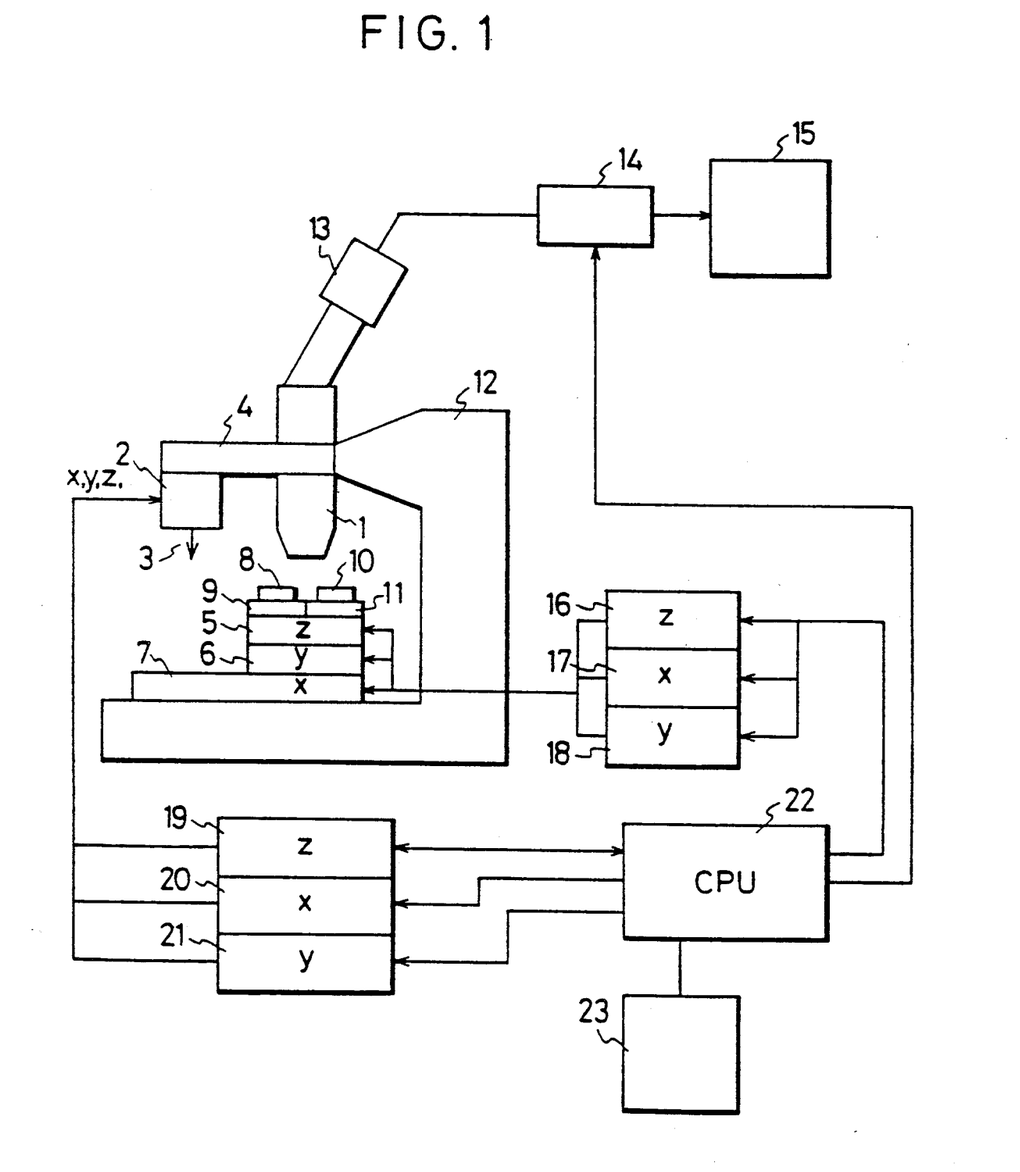
FIG. 1 is a figure showing one embodiment of this invention.

An embodiment of the device is given in FIG. 1. As regards the structure of the device, the calibrating head portion is arranged in such a way that the object lens 1 of the optical microscope acting as the microscope with the wider field of view, the needle 3 of the STM and the precision drive device 2 are fixed onto a supporting plate 4, and are made to come directly over the x 7, y 6 and z 5 stages by means of the arm 12. The x stage has a large moving stroke for moving the sample to the position of the needle of the STM or the position of the optical axis of the objective lens of the optical microscope. The calibration sample 8 is attached to the z stage 5 via the detachable sample mount 9. Meanwhile, the standard sample 10 for positioning (for details refer to FIG. 3) is attached to the z stage 5 via the fixed sample mount 11. The optical microscope image is displayed at the optical microscope image display device 15 by adding a cross-cursor image to the optical microscope image in the cross-cursor display-moving system 14 via a CCD camera 13. The initial position of the cross-cursor is normally set in the center of the field of view of the optical microscope (the position of the optical axis). The STM image is displayed at the STM image display device 23 by taking in the signal for the height of the form from the z servo system 19 while scanning with the x and y scanning system (20 and 21) and passing it through the central processing unit 22. The movement of the sample is effected by driving the stages using the central processing unit 22 via the stage controllers x, y and z (16, 17 and 18).

The positioning operation with this device is discussed later, but, in outline, it is as follows. For the positioning, the standard sample 10 is first observed by a device with a wide field of view (an optical microscope or SEM). The explanation is given here using the example of an optical microscope. The center of the field of view or the cross-cursor is aligned on the central line of the pattern shown in FIG. 3.

Figure 3:
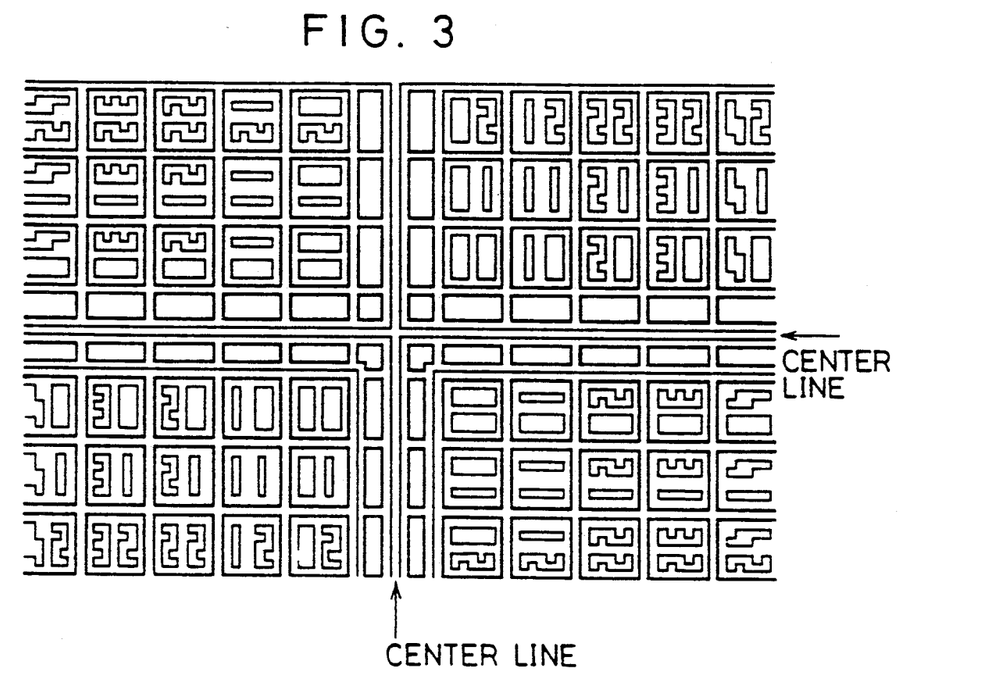
FIG. 3 is a figure showing an example of the standard sample used in the embodiment, FIGS. 4(*a*) and (*b*) are figures showing the Arabic numeral patterns and quadrant separation method in FIG. 3, FIGS. 5(*a*) and (*b*) are figures explaining the bit pattern standard sample (central portion) and the bit-allocation rule using a separate standard sample for use in this invention.

The coordinates of the x and y stages at this time are taken to be ($x_o$ and $y_o$). Following this, the x stage is moved and the needle 3 is moved over the distance ($x_L$) by which it ought to arrive over the central lines of the abovementioned pattern, although in practise it will only be positioned to an accuracy of $\pm 2\mu$ owing to distortions in the needle 3, errors in attachment and the like. In order to ascertain the position of the needle 3, in practise the STM image is taken up to determine the position of the image on the standard sample 10, or in other words the coordinates ($x_s$ and $y_s$) from the center of the pattern. Thus, the amount of compensation between the cross-cursor of the optical microscope and the needle of the STM is determined as $\Delta x = x_L + x_s$ and $\Delta y = y_s$. Following this, the calibration sample 8 is observed under the optical microscope and the calibration location is made to coincide with the above-mentioned cross-cursor. The location designated under the optical microscope can be observed directly thereafter under the STM by moving the stages by the above-mentioned compensation amounts $\Delta x$ and $\Delta y$ so carrying out the STM calibration.

Figure 2:
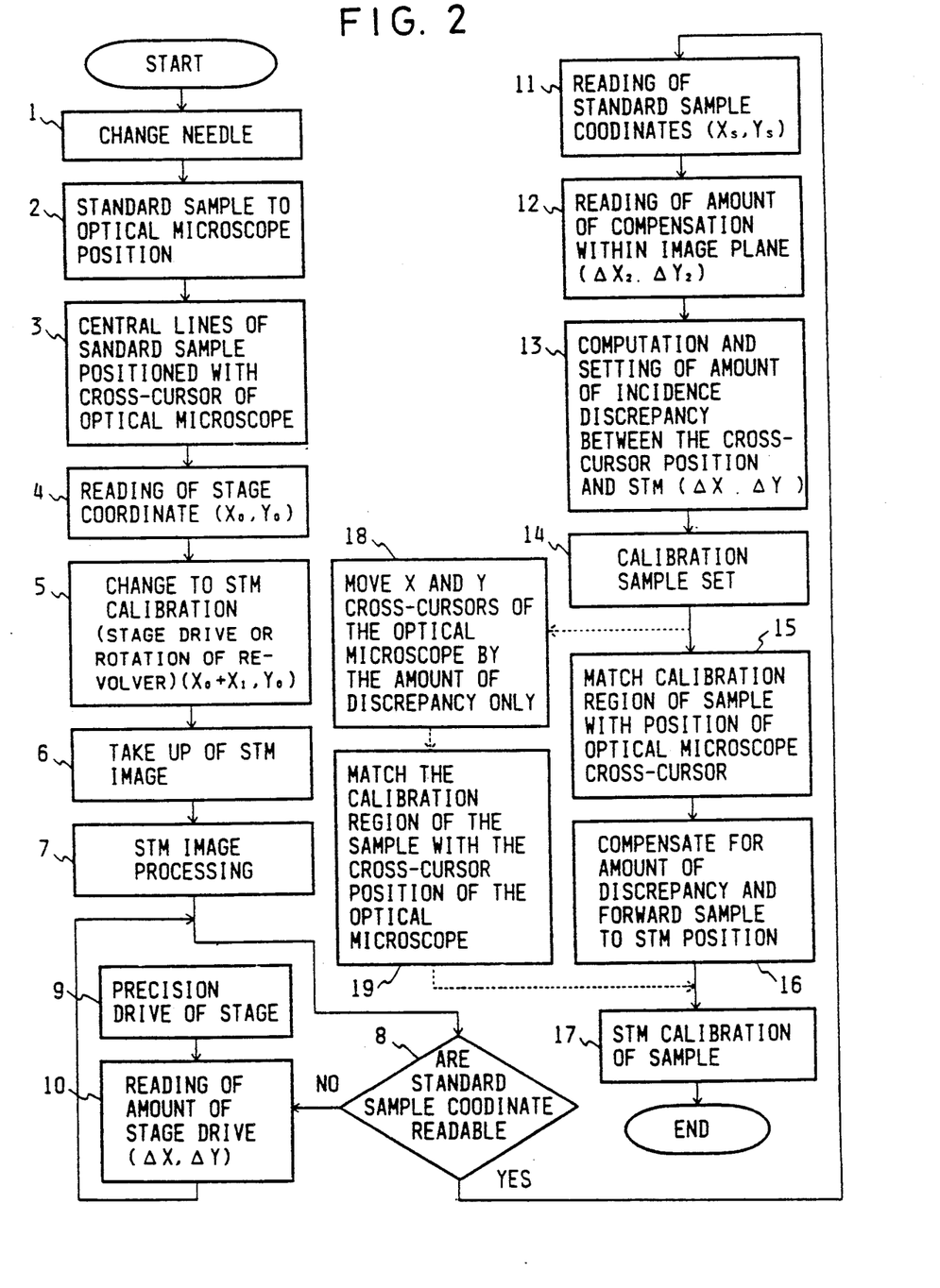
FIG. 2 is a figure showing a flow chart for positioning with the embodiment of FIG. 1.
Figure 4A:
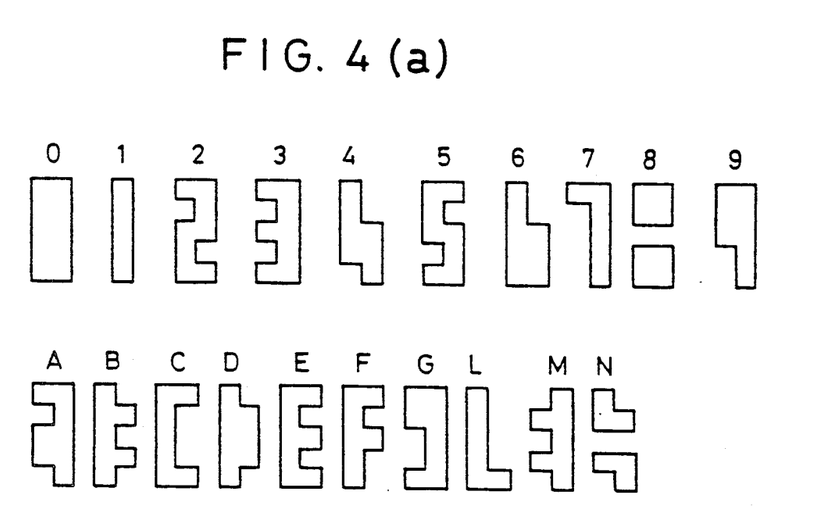
Figure 4B:
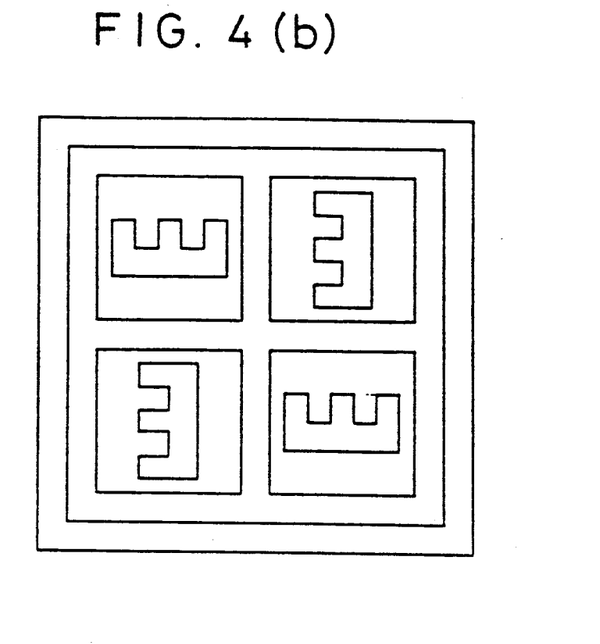
Figure 5A:
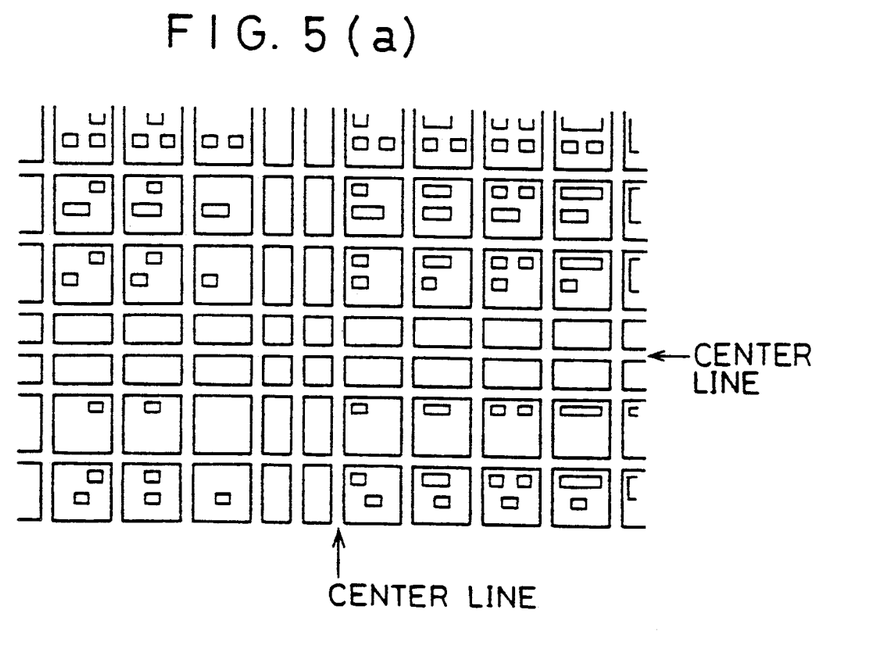
Figure 5B:
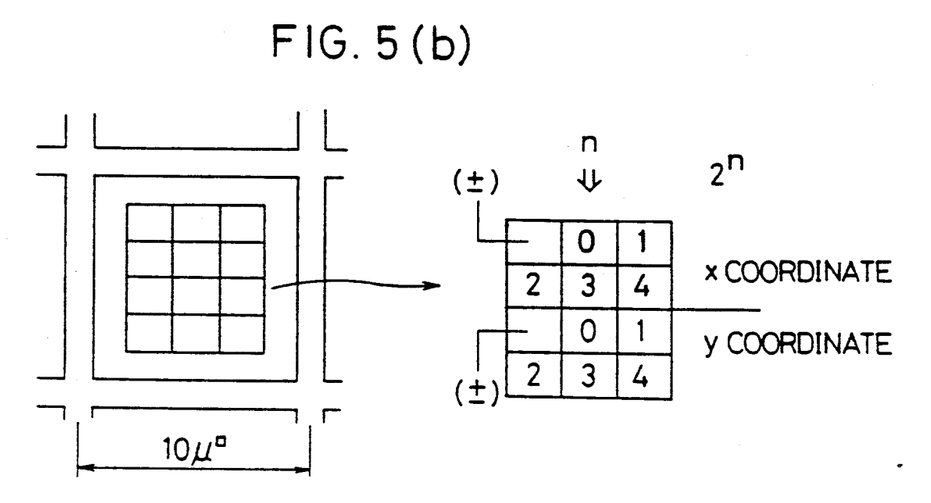

The various operations are now described in detail with reference to the flow chart shown in FIG. 2. In a STM in which the needle is changed under operation 1, it is necessary to determine the relationship between the needle tip and the cross-cursor position of the optical microscope every time the needle 3 is changed since it is a consumable article. At present, the discrepancy in the position of each needle 3 is of the order of 0.2 to 0.3 mm. The standard sample is now explained. FIG. 3 is an example of a standard sample, the middle being central lines which run vertically and horizontally thereby dividing it into four quadrants. Further, there is a $10\mu \times 10\mu$ grid of cells in each of the quadrants with two Arabic numerals written within them, and these indicate the coordinates within the pattern. The $10\mu \times 10\mu$ size is due to the fact that the largest frame of the STM is about $12\mu$. Because each numeral is produced using a $1.2\mu$ rule, the twenty Arabic numerals shown in FIG. 4(a) are used. As shown in FIG. 4(b), in order to secure a large pattern area, use is made of Arabic numeral characters (here the numeral 3 is used for the purposes of the explanation) which are upright and projecting in the first quadrant, rotated through 90° and projecting in the second quadrant, upright and indented in the third quadrant, and rotated through 90° and indented in the fourth quadrant. FIG. 5(a) shows a separate pattern example. Here, the coordinate numerals are replaced by binary bits, and this is illustrated by the method in which the rule shown in FIG. 5(b) has been taken as one example. This pattern has the advantage that pattern recognition is easily performed by a central processing unit, and at present it is possible to construct a pattern with an aperture of $640\mu$ due to the high data densities.

Figure 6:
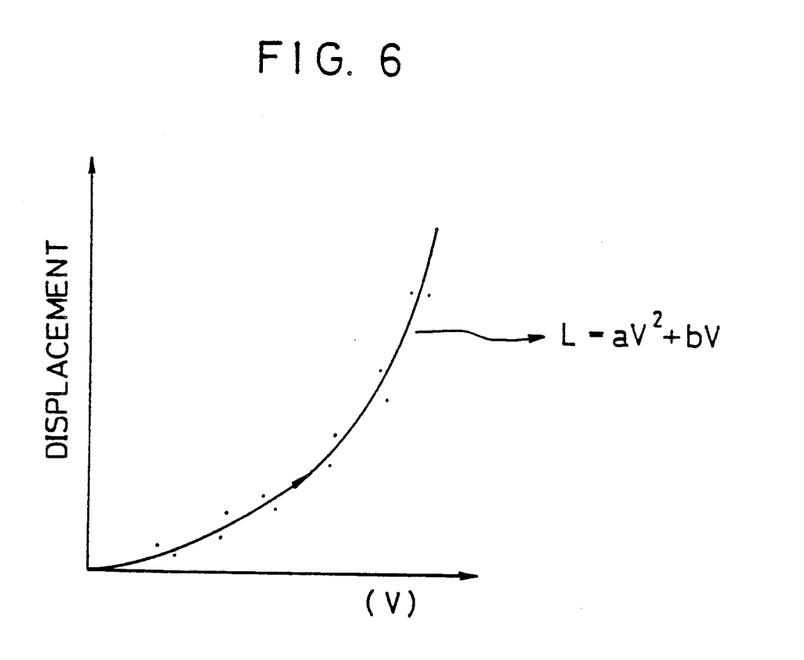
FIG. 6 is a figure showing the relationship between the STM precision movement element and the change in the applied voltage, FIGS. 7(*a*)–(*b*) is figure explaining an example of the display of a STM image.
Figure 7A:
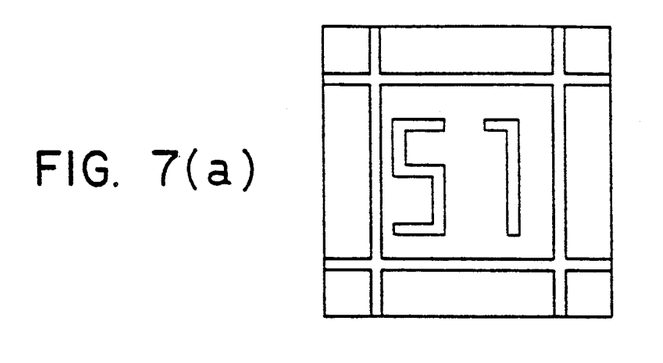
Figure 7B:
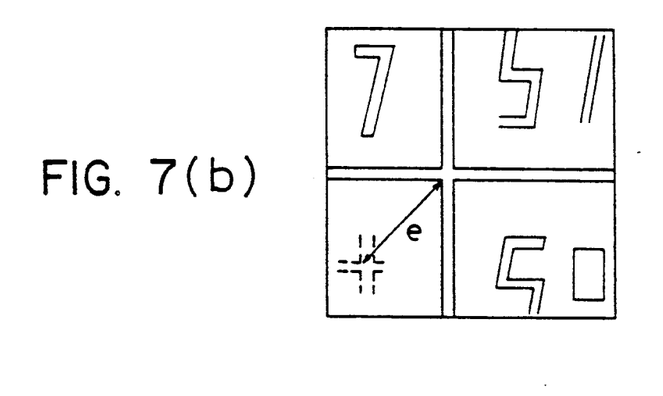
Figure 7C:
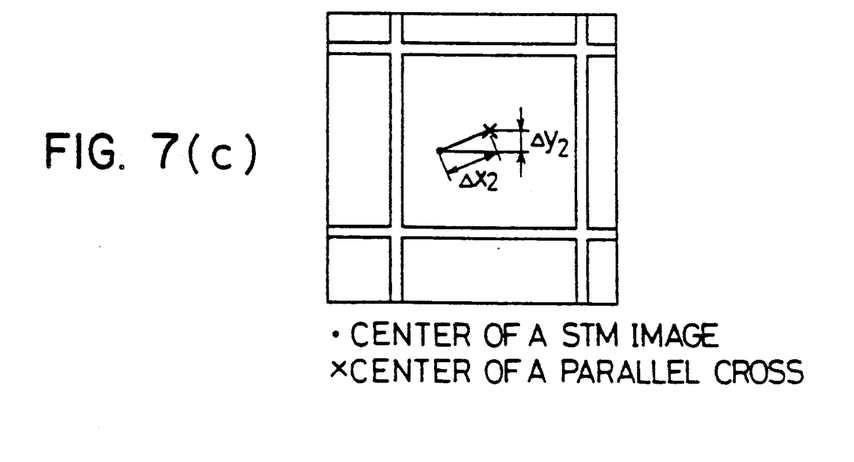
Figure 8:
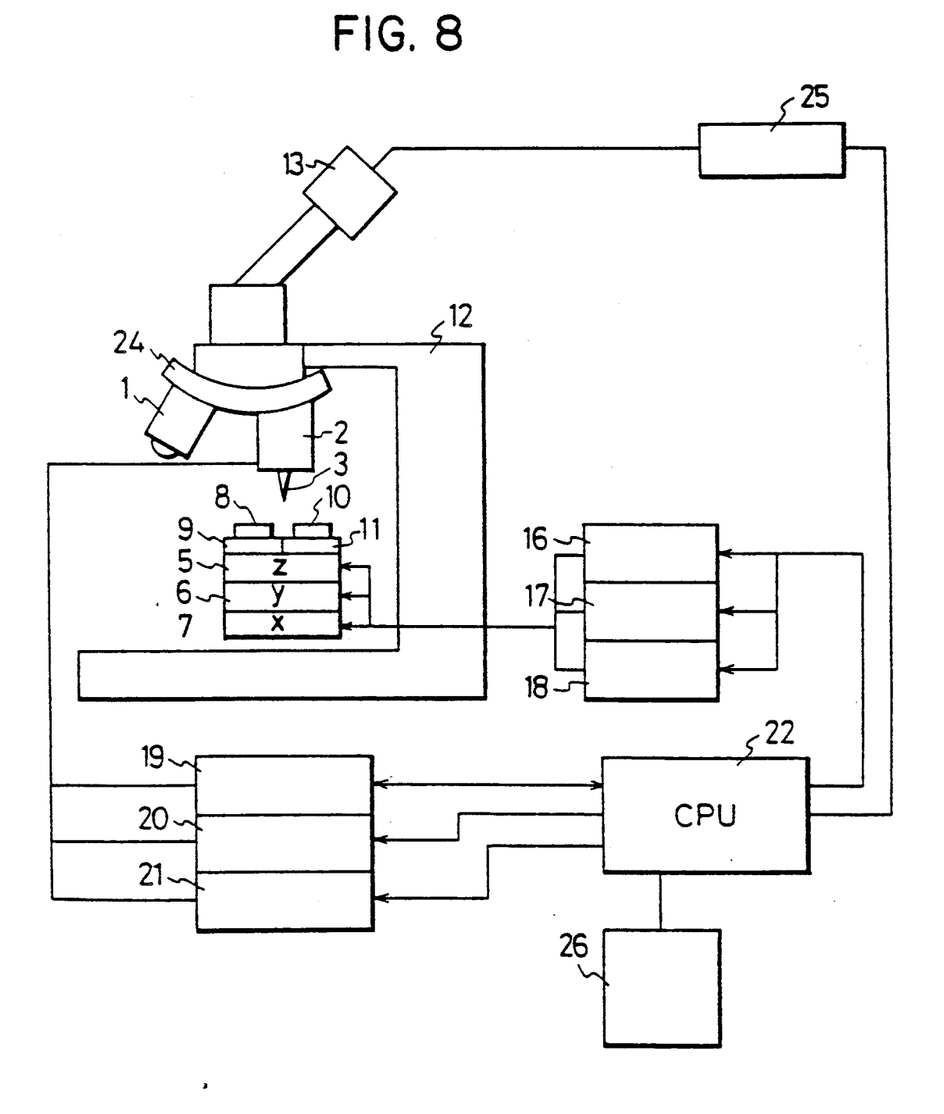
FIG. 8 is a figure showing a second embodiment of the invention.

The optical microscope cross cursor is accurately aligned (about $\pm 0.5\mu$) on the central lines of the pattern using 2, 3 and 4 in the flow chart, and the coordinates of the stage at this time ($x_o$ and $y_o$) are memorized by the central processing unit. Following this, the x stage is moved by the amount $x_L$ (the set distance from the optical axis of the optical microscope to the center of the STM needle) by operation 5, and then the Z stage is conveyed to the tunnelling region at low speed. In operation 6, the STM makes a single frame surface scan of a frame of $10 \times 12\mu$ and the STM image is taken up. In operation 7, distortions are removed from the STM image by performing a low-pass spatial filtering operation on the image and then performing an operation on the image with the non-linear compensation coefficient of the fine drive element (piezo element) 2 of the STM. In this compensation coefficient, the relationship (FIG. 6) with the amount of change is determined when applying a ramp-function input to each of the piezo elements and the compensation coefficient is determined by subjecting the resulting curve to a two-dimensional curve least square fit. In operation 8, a judgement is made as to whether the cells of the grid discussed previously are within the picture frame of the STM image display device as shown in FIG. 7(a). This is judged by whether the template for the grid (a soft-produced pattern) is in alignment with the grid image in the above-mentioned picture frame. In operations 9 and 10, when the STM image of the grid is not within the picture frame as shown in FIG. 7(b), the stage is moved by a small amount in such a way that the image of the grid comes within the picture frame on the abovementioned display device. As regards the distance moved, as shown in FIG. 7(b), the movement is made to a distance e which is close to the position in which it ought to have been in the first place (indicated by the broken line) within the 4 corners of the grid of the STM image. As regards the movement at this time, the x and y stages may be moved after having moved the z stage and disengaged from the tunnelling region, or the x and y stages may be moved after raising the z axis by applying a voltage to the z axis of the precision drive element of the STM, but the latter method is more accurate as it avoids errors in the x and y directions which accompany movement of the z axis. Here, the amount of movement ($\Delta x_1$ and $\Delta y_1$) is no more than 5 to $6\mu$ respectively. In operation 11, the in-frame coordinates of the abovementioned display device are read. For this purpose, the STM image is converted to binary using a threshold of an appropriate height, and the Arabic numerals for the STM image are recognized by an alignment with the Arabic numeral template in FIG. 4(a). Further, the bit pattern shown in FIG. 5(a) has the advantage that the alignment with the template can be easily performed. The pattern coordinates ($x_2$ and $y_2$) are then recorded in the central processing unit. In operation 12, the amount of discrepancy between the center of the abovementioned display device and the center of the grid ($\Delta x_2$, $y_2$) (shown in FIG. 7(c)) is determined. In operation 13, the amount of discrepancy between the position of the cross-cursor of the optical microscope and the STM needle is calculated from $$\Delta x = x_L + x_s + \Delta x_1 + \Delta x_2$$
$$\Delta y = y_s + \Delta y_1 + \Delta y_2$$

and put into memory. In operations 14 and 15, the actual calibration sample is set on the microscope, the cross-cursor of the optical microscope is matched with the region for calibrating and the coordinates ($x_1$ and $y_1$) at this time are put into memory. In operations 16 and 17, the stage is moved so as to obtain ($x_1 + \Delta x$, $y_1 + \Delta y$) and calibrated using the STM. By way of a separate method, a similar effect is obtained if, after setting the calibration sample on the microscope, the cross-cursor of the optical microscope is moved by an amount corresponding to the abovementioned amount of discrepancy $\Delta x$, $\Delta y$ as shown in FIG. 2(B), and the STM needle position is displayed within the field of view of the optical microscope. Another embodiment is given in FIG. 8. The observation of the sample is carried out successively from low magnification to high magnification and STM calibration by changing the object lens, because it is constructed with the precision drive element 2 of the STM incorporated into the optical microscope revolver portion 24 of the calibrating unit portion. Further, the mechanism in which movement was made on one axis in the x stage as shown in FIG. 1 becomes unnecessary. Further, the optical microscope image goes through the CCD camera 13 and is converted into a digital image by means of an analog-digital converter 25 and is stored in the central processing unit 22. It is possible to directly determine the discrepancy between the optical microscope and the STM needle by comparing this image with the STM image (flow chart operation 7 in FIG. 2). In this case, the flow chart operations 3 and 4 discussed previously are replaced by the intake of the optical microscope image. Thus, the structure of FIG. 8 is simpler than the structure of FIG. 1.

As has been explained above, with the present device, a wide region is observed under an optical microscope or SEM and the observation region identified, and it is possible to accurately superpose the scanning region of a STM upon this location, and it is possible to change the magnification and to observe a single sample from a magnification of several tens to a magnification of several millions. Further, it has now become possible to guide the STM needle and to perform STM image calibration in a simple manner with an accuracy of $4\mu$ or less on a specific location of the sample for observation, which has hardly been possible hitherto.

What is claimed is:

1. Composite scanning tunnelling microscope apparatus with a positioning function where the composite scanning tunnelling microscope apparatus is equipped with a scanning tunnelling microscope and with a microscope with a wider field of view, characterized in that said apparatus comprises a standard sample having a surface composed of surface elements, each surface element having coordinates, said surface being provided with a pattern of microscopically observable indicia identifying the coordinates of at least selected surface elements for positioning, said standard sample being mounted in a stage comprised within said microscope apparatus, a calculating means which calculates the relative distance between the optical axes of both microscopes from the positional relationship between the images of the indicia of the standard sample observed under both of the abovementioned microscopes, a computing means which computes the amount of discrepancy of the scanning tunnelling microscope needle based on the results from the said calculating means, and a stage controller which controls the stage based on the results from the said computing means such that the optical axes of both microscopes are on the same point.

2. Apparatus as defined in claim 1 wherein said surface elements in said standard sample surface are arranged according to a two-axis coordinate system having an origin and said indicia identify the distance of each selected surface element from the origin along each axis of the coordinate system.

* * * * *